April 24, 1962 R. B. CLARK ET AL 3,031,522
SHEATHED ELECTRICAL CONDUCTORS AND INSULATION THEREFOR
Filed Feb. 13, 1958

INVENTORS,
ROBERT B. CLARK,
LAURENCE F. PEROTTE
by William D. Roberson
His Attorney

United States Patent Office 3,031,522
Patented Apr. 24, 1962

3,031,522
SHEATHED ELECTRICAL CONDUCTORS AND INSULATION THEREFOR
Robert B. Clark, Marblehead, and Laurence F. Perotte, Arlington, Mass., assignors to General Electric Company, a corporation of New York
Filed Feb. 13, 1958, Ser. No. 715,013
5 Claims. (Cl. 174—102)

This invention relates to sheathed electrical conductors and is particularly concerned with an improved insulating material for such conductors.

The sheathed conductors of the type with which the present invention is concerned are those designed for high temperature applications in which one or more conductors are enclosed within a tubular metallic sheath and supported in spaced relation within the sheath by a layer of heat refractory, electrically insulating material. Specific embodiments of such sheathed conductors may take the form of thermocouple assemblies, spark-plug connecting leads or the like.

Measurements of temperatures within high-temperature power plants, such as aircraft gas turbines are customarily made with temperature detectors employing thermocouples having conductors sheathed in a cylindrical metallic housing or barrel tightly packed with refractory insulating powder or a substantially solid ceramic core. Such thermocouples are necessarily of the most rugged construction to avoid rapid deterioration under extreme vibration and temperature conditions. However, for speed of response to rapid variations in the measured temperature, the thermocouple junction of the conductors in such temperature detectors usually extends beyond the end of the outer metallic housing through an opening in the end of that housing, and the insulating core may thus be exposed to the fuel. When this occurs, the fuel may penetrate the core and be drawn into the upper portions of the barrel where subsequent rapid heating can carbonize the fuel. Water vapor released by the combustion of the fuel may also be drawn into the insulating material of the core in the same manner and the result of this carbonization and the hydration may be a harmful reduction of resistance between the conductors or between the sheath and the conductors. The principal reason behind this type of failure in thermocouple assemblies lies in the necessity of exposing at least a portion of the insulant filling the metallic sheath.

In other types of sheathed conductor assemblies, different kinds of operational failure may be ascribed to the necessity of exposure of the insulation. For example, in a high-voltage lead designed for connection to a spark plug, the most frequent point at which arc breakdown occurs is at the ends of the conductor where arcing across the exposed surfaces of the insulating material can short circuit the spark plug gap. In an effort to overcome this well-known difficulty, resort is sometimes had to the use of ceramic plugs cemented within the ends of the sheathed conductor assembly and shaped on their exposed surfaces to provide a long breakdown path between the outer sheath and the enclosed conductor. The ceramic plug also serves to prevent the insulant within the sheath, usually of a powdered form, from crumbling and falling out at the ends. The use of such ceramic plugs, however, still leaves an interface within the sheath between contacting surfaces of the plug and powdered insulant, along which interface high-voltage arc breakdown can and does occurs. It has not appeared desirable to form sheathed high-voltage conductors with solid ceramic insulating cores continuously from end to end because the ceramic core would have to be fired in situ at extremely high temperatures after the conductor has been bent into its final shape, and because the resulting construction would be extremely brittle under thermal and mechanical shock. Even a single hairline crack in the solid ceramic insulant would provide a high-voltage breakdown surface.

With these difficulties in mind, it is an object of this invention to provide a sheathed conductor in the form of a thermocouple assembly, high-voltage conductor, or the like having a tough non-brittle insulant which is not only highly resistant to fracture due to thermal and mechanical shock, but is also relatively impervious to the diffusion therethrough of water vapor or carbonizable fuels tending to decrease its effectiveness as an insulating agent.

A further object of this invention is to provide a novel mineral insulating composition suitable for use in thermocouple assemblies and high-voltage conductors for high-temperature applications.

It is still another object of this invention to provide an improved method of producing such an insulating composition.

By way of a summary account of one aspect of this invention, there is provided a thermocouple assembly having a core of insulating material within a tubular metallic housing surrounding a pair of spaced thermocouple conductors which project beyond one end of the core and housing to form a thermocouple junction. The opposite end of the housing is closed by terminal provisions for a thermocouple cable, and mounting apparatus is also disposed near that end to support the free junction end in a fluid stream which is subject to temperature measurement. In a preferred embodiment of the invention, the major portion of the insulant is comprised of powdered magnesium oxide with the addition thereof of 20% by weight of a glass which has a softening point of 915° C. and a working point of 1200° C. The magnesium oxide and the glass are mixed in finely divided form and compacted within the sheath to form an insulant about the thermocouple leads. Thereafter, the entire assembly is subjected to a heat treatment which brings the insulating material up to a temperature of about 950° C. so that the glass portion of the mixture becomes slightly plastic. The temperature is not elevated enough, however, to cause the glass particles to flow. After cooling, the thermocouple assembly is found to possess several distinct improved characteristics. The insulating material is mechanically strong but not brittle and it is even possible to machine away portions of the outer sheath without the insulant crumbling or cracking under the strain. Furthermore, thermal shock, so often encountered in the operation of such thermocouple assemblies, does not cause fracture of the rigid insulant. An additional important characteristic is that the insulant presents a nearly homogeneous barrier against the entrance of fuel or water vapor. Because the insulating material is not very porous and because the inherent toughness of the material resists cracking under the most extreme conditions which the thermocouple is likely to encounter, deterioration of the insulating value of the insulant due to the penetration of fuel or water vapor is greatly minimized. The thermocouple assembly has a considerably longer life, therefore, than most thermocouples designed to perform under the same conditions.

While the scope of this invention is not to be limited except by a fair interpretation of the appended claims, the details of the invention, as well as further objects and advantages, may best be understood in connection with the accompanying drawings wherein:

Figure 1:
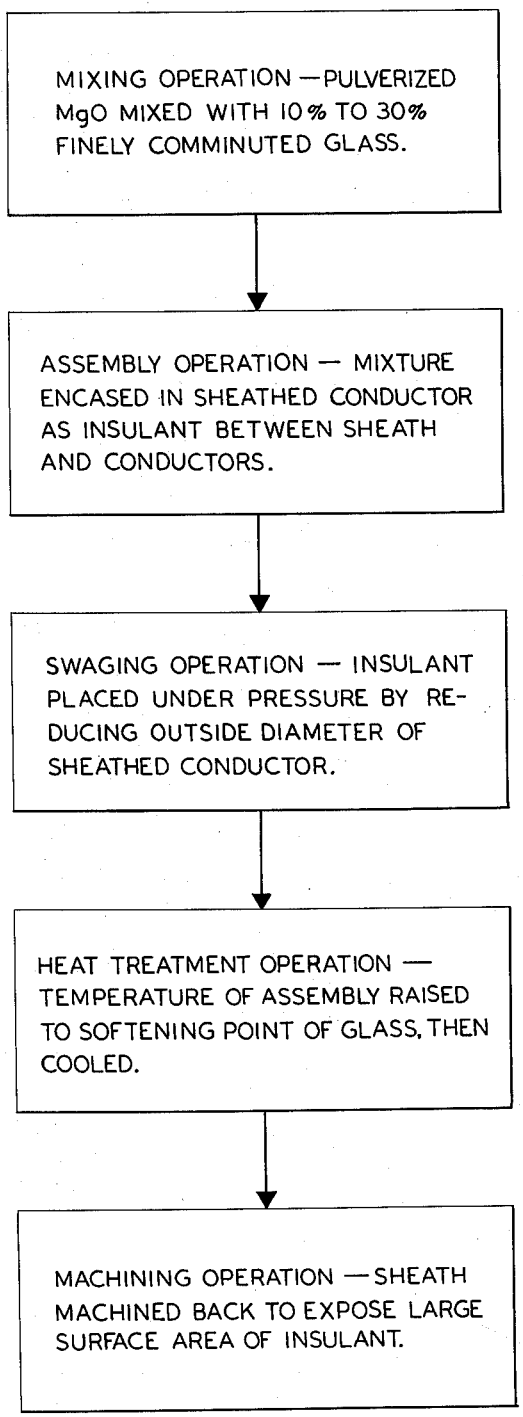
FIGURE 1 is a block diagram illustrating a method of producing a sheathed conductor assembly according to the present teachings.

FIGURE 1 may be used as a ready reference guide to a quick comprehension of the steps involved in the production of sheathed conductors according to the present invention. In an early stage of the fabrication of the conductor assembly, pulverized magnesium oxide is mixed with various percentages between 10% and 30% of finely comminuted glass. We have found the final characteristics of the insulant to be somewhat better if the average particle size of the basic insulant, in this case magnesium oxide, is somewhat larger than the average particle size of the glass. For example, superior results were obtained with magnesium oxide having a range of particle sizes from 60 mesh to 300 mesh with the average size about 80 mesh mixed with glass divided finely enough for all of it to pass through a 150 mesh screen. To ensure homogeneity, the mixture may desirably be tumbled in a hollow vessel for several hours. Following this, the mixture is poured into the metal sheath with the conductors centered therein and tamped down. To further compact the insulation, the sheathed conductor assembly is then subjected to swaging, this being an operation which reduces the outside diameter of the sheath and forces the constituent particles of the insulant into close contact with each other.

After swaging, the conductor is subjected to a heat treatment operation which is peculiar to the present invention. It should not be confused with a typical annealing operation which often follows swaging to remove stresses developed in the metallic sheath for the temperature and length of time of an anneal are determined by the characteristics of the metallic parts of the assembly, whereas the parameters of the presently proposed heat treatment are determined exclusively by the characteristics of the glass employed in the insulating material. The upper and lower limits of the temperature of this heat treatment depend not only upon the particular type of glass employed, but also upon the prior history of the glass. In some of the more satisfactory embodiments of the present invention, we have employed a hard lime glass having an approximate composition of silicon dioxide 58.6%; aluminum oxide 18.8%; magnesium oxide 9.1%; calcium oxide 7.3%; boron trioxide 4.0%; sodium oxide 1.4%; and potassium oxide 0.2% with residual impurities making up the balance of the composition. This glass is commercially available as Corning type 1710 glass. If the glass has not since its production been exposed to water in vapor or liquid form, its softening point, the temperature at which it becomes slightly plastic but remains congealed, is about 915° C. Its working point, at which it is sufficiently liquid to be shaped or blown, is about 1200° C. Since glass is a supercooled liquid, these temperatures, though known in the trade as "points," are in reality approximate temperature regions. The same glass, however, if exposed to some form of water, may acquire considerably elevated softening and working points, presumably as a result of chemical reaction with the carbon dioxide almost always present to some degree with water. Because of the small particle sizes employed, this chemical reaction, which ordinarily takes place on a very small scale, can be very significant.

The temperatures at which the particular glass employed changes its physical properties are important and must be known if the present invention is to be practiced intelligently instead of by trial and error for, in the heat treatment operation to which the sheathed conductor assembly is subjected, the temperatures should be sufficient to soften the glass but should not be high enough to cause the glass particles to flow. Using the unhydrolyzed glass specified above, we have had very good success by heat treating the assembly at 950° C. for one hour and then allowing the assembly to cool. Temperatures as high as 1050° C. have also been employed with satisfactory results. Although what takes place during such a heat treatment operation is not known with absolute certainty, it is our opinion that the glass particles, being under compression as a result of the swaging operation, are forced into the voids between the magnesium oxide particles, thus effectively sealing the voids and at the same time locking the magnesium oxide particles in place and forming a hard, homogeneous, and rigid solid.

If the insulating mixture is not placed under compression as by swaging, prior to the heat treatment, it is not converted by the heat treatment into a rigid solid having any substantial mechanical strength and may even be crumbled with one's fingertips. Furthermore, it remains fairly porous and does not acquire the desirable electrical properties which it is capable of possessing.

If too great a percentage of glass is used, or if the sheathed conductor is heated to a temperature at which the glass particles flow, the changed physical properties of the insulant suggest that the glass particles lose their individuality forming a continuous matrix, as it were, within which the magnesium oxide particles are imbedded. This has been our interpretation of the phenomena based upon such observations as a decrease in insulation value of the insulant and a greatly increased brittleness, if the curing temperature has been allowed to reach a temperature at which the glass flows.

It is common knowledge that, at the elevated temperatures at which sheathed thermocouple assemblies and sheathed spark plug connecting leads are often expected to function, many glasses, whether in a powdered state or in a solid mass, are poor electrical insulators. It is therefore not surprising that the insulating properties of the insulant at elevated temperatures are observed to decrease as the amount of glass in the mixture is increased much beyond 30%. Even with lower percentages, such as 10% or 20%, however, the high temperature resistivity of the insulant is found to be considerably decreased if the material is once subjected to an excessively high curing temperature, a strong indication that the glass particles have in fact fused together forming an electrically conducting path about the magnesium oxide particles.

With proper heat treatment, the hardness of the magnesium oxide-glass composition increases as the proportion of glass to magnesium oxide is increased. The addition of as little as 10% by weight of glass to the magnesium oxide hardens the insulant sufficiently to permit machining away a portion of the sheath. This advantage will be shown to be a desirable feature in connection with the description below of the high-voltage connecting lead shown in FIGURE 3. Although some tests conducted to determine the sealing properties of various magnesium oxide-glass compositions seem to show 10% and 20% glass compositions to be equally effective, the most severe tests indicate that, as the amount of glass is increased, the insulator becomes more and more impervious to the penetration of fuel and water vapors. Still assuming a proper heat treatment, the addition of glass to the magnesium oxide up to 20% by weight does not appreciably affect the high temperature electrical characteristics of the magnesium oxide and at normal operating temperatures the electrical resistance of the magnesium oxide-glass insulation is equal to or better than that of magnesium oxide alone. With a glass content beyond 30%, the resistivity of the insulant decreases to such a point and the insulant becomes so brittle in thermal and mechanical shock tests that further increases in glass content are not warranted. For spark plug connecting lead applications, we prefer to employ a mixture of 10% glass to 90% magnesium oxide by weight because of its very high electrical resistance and superior thermal and physical shock characteristics. Thermocouple assemblies, however, do not necessarily need the extremely high insulation resistivities required by the insulation in a spark plug assembly. In the manufacture of thermocouple assemblies, we therefore prefer to employ an insulant consisting of magnesium oxide with from 20% to 25% of glass because of its somewhat improved sealing properties which tend to prolong the useful life of the thermocouple assembly.

As might be expected, the proportion of glass to magnesium oxide, while important, is not so critical that exact limits can be set with absolute certainty on the relative amounts of each. Naturally, different glasses have different specific gravities and 20% by weight of one glass may occupy a larger volume of the insulant than the same proportion by weight of another glass. The range of 10% to 30% by weight of the glass should therefore be considered as an approximation of the desirable range. Nevertheless, a minimum proportion of about 10% is considered desirable because, if the amount of glass is much less than this, it is bound to be relatively ineffective to seal the voids in the otherwise porous material whereas, if much more than 30% of glass is used, the composition becomes glass-like and brittle.

In addition to the numerous glasses which might be employed, certain substitutions may be made for the basic pulverized insulant. Instead of magnesium oxide, other frequently used mineral insulating materials, such as aluminum oxide or beryllium oxide, may be employed, the essential requirements of the basic insulating material being relative chemical inertness, a susceptibility in powdered form to being compacted, very high electrical resistance, a higher melting point than the softening point of glass, and compatibility with the glass to be employed. Of the above-identified materials, all of which produce satisfactory results when treated according to these teachings, we have preferred to use magnesium oxide because its temperature coefficient of expansion, being higher than that of aluminum oxide, more nearly approximates the coefficients of expansion of the stainless steels customarily employed to form the sheath of the sheathed conductors. Beryllium oxide, being toxic, presents additional problems in handling not encountered in the use of magnesium oxide.

Figure 2:
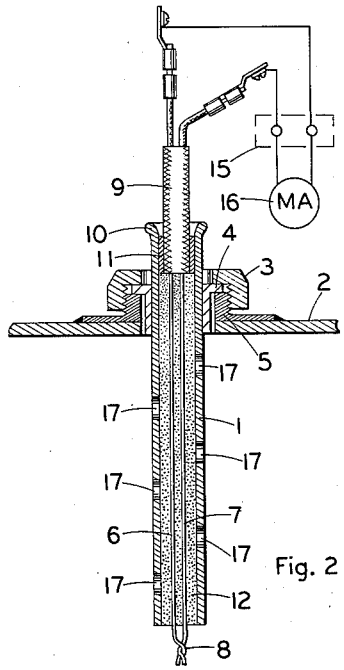
FIGURE 2 is a partly pictorial cross-sectional view of a thermocouple assembly which may be constructed according to the present disclosure.

The thermocouple construction shown in FIGURE 2 may be employed in the practice of this invention. Referring to this figure, the tubular thermocouple sheath or housing 1 is shown installed by a mounting through an aperture in the wall 2 of a gas turbine power plant or of any chamber containing a fluid whose temperature is under measurement. This mounting includes a nut 3 having an internal annular flange which bears against a flange 4 fixed to one end of the thermocouple sheath 1. Flange 4 in turn rests on an externally threaded mounting member 5 which is welded to the chamber wall 2 in a gas-tight relationship. Tubular sheath 1 may be made of stainless steel or other suitable material, and a pair of thermocouple conductors 6 and 7 of dissimilar metals runs longitudinally therethrough terminating in a protruding junction 8 at one end and in connections with an insulated coupling cable 9 at the mounting end. An outward flaring 10 of sheath 1 protects cable 9 from abrasion, and a plug bushing 11 serves to fix the cable firmly in position and seal the outer end of the sheath.

Dissimilar conductors 6 and 7 may be of the type commonly employed in thermocouple pyrometry, one being a nickel-chromium alloy (90 percent nickel and 10 percent chromium) and the other being a nickel-aluminum alloy also containing small amounts of manganese and silicon (95 percent nickel, 2 percent aluminum, 2 percent manganese, and 1 percent silicon). Junction 8 may be rendered secure by welding. Insulation and positioning of conductors 6 and 7 is achieved by an insulating core 12 consisting of an insulant prepared in the manner described above. A pair of cable terminals are shown coupled to a reference junction 15 and a remote milliammeter or other suitably calibrated temperature indicating instrument 16. While ordinarily the reference junction 15 is merely situated such that it is protected from the high temperatures under measurement, an ice point or other conventional reference temperature may be provided to realize greater accuracies.

If desired, the casing or housing 1 may be provided with a number of relatively small apertures 17 in a manner shown to be desirable in a patent numbered 2,761,005 in the name of Chamberlain et al. for Non-Carbonizing Thermocouples, assigned to the same assignee as that of the present invention. As pointed out in the Chamberlain et al. patent, these apertures in the outer sheath are provided to ensure that fuels absorbed by the insulant are volatized without carbonization. Although the insulating material described herein is relatively impervious to the penetration of fuel vapors, such absorption of fuels as might occur in time through minute imperfections in the relatively homogeneous insulant may be expelled from the insulant through the apertures. The employment of such a construction would serve, therefore, to compound the advantages obtained by the practice of the present invention with those described in the aforementioned patent.

Figure 3:
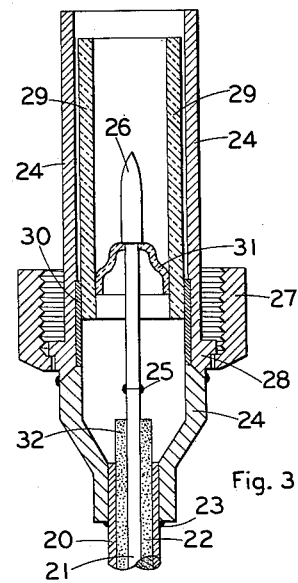
FIGURE 3 is a cross-sectional view of an end assembly of a high-voltage conductor manufactured in accordance with these teachings.

FIGURE 3 illustrates an end assembly of a high voltage lead including a sheathed electrical conductor connected to a detachable electrical connector. The sheathed conductor itself comprises an outer metallic sheath 20 preferably composed of a stainless steel containing about 18% chromium, 8% nickel, and the balance principally iron. Coaxially within the outer sheath is a central high-voltage conductor 21 supported and insulated from sheath 20 by a core 22 of insulant prepared in the manner described above with one possible exception to be mentioned below. The sheath 20 is preferably attached by a weld 23 to the outer terminal 24 of the connector while the high-voltage conductor 21 is similarly affixed by a weld 25 to the high-voltage terminal 26 of the connector. In use, the electrical connector is fastened down in much the same manner as is the thermocouple assembly shown in FIGURE 2, except that in tightening nut 27 which has an internal annular flange bearing against the flange 28 on the outer terminal 24, the two terminals are drawn into contacting relationship with mating terminals of another connector not shown in the drawing. The other connector may be part of a spark plug assembly, the output terminals of a high-voltage power supply, or the like.

To minimize the potentiality of arc-over, a ceramic sleeve 29 is positioned around the inner surface of the outer terminal 24 and retained in place by having an outer metallized surface silver-soldered to a nickel liner 30 joined to the inner surface of the outer marginal. The high-voltage terminal 26 is supported in place by a cup-shaped spacer 31.

It will be observed that the insulant 22 extends well beyond the end of sheath 20, leaving an exposed surface 32 which is long enough to prevent high-voltage breakdowns across it. This surface is exposed when, during manufacture, the outer metallic sheath is machined away at the end of the sheathed conductor. Because only the terminal ends of a high-voltage sheathed conductor for this type of application are exposed, it is not essential that the entire assembly be heat treated according to these teachings. Instead, it may be desirable to subject only the last two or three inches of the sheathed conductor to such a heat treatment, since this should be sufficient to prevent the absorption of undesired vapors and to provide a rigid extended shoulder when a portion of the metallic sheath is machined away.

The construction described would not be possible with an insulant which is merely compacted in the normal fashion for, freed of the protection of the outer sheath, the unconfined powdered insulant would rapidly fall away, especially when subjected to vibration. A solid fused glass end surface on the insulant, such as has often been proposed, does not provide an elongated surface and is easily subject to fracture as a result of mechanical and thermal shock, whereupon water vapor may penetrate easily. The insertion of a plug of ceramic tubing extending out of the sheath, which is also frequently proposed, may well provide a long break-down path across its exposed surface, but it leaves a short breakdown path inside the sheath along the interface between the plug and the basic insulant. The present insulation, on the other hand, is very tough but not brittle. Consequently, it may be machined easily to provide a long surface and is highly resistant to cracking under thermal or mechanical shock. It is, furthermore, nearly impenetrable and presents a very effective barrier against the entrance of harmful vapors.

As may be apparent from the above, the foregoing examples are intended to be illustrative of these teachings and not necessarily limiting on their scope. To those skilled in this art, there will doubtless occur a number of variants well within the scope of the present disclosure.

What we claim as new and desire to secure by Letters Patent of the United States is:

1. A method of manufacturing a sheathed electrical conductor suitable for thermocouple assemblies and high voltage, high temperature spark plug connecting leads and resistant to the deterioration of the insulation due to high temperatures, vibration, and the effects of carbonizable fuel and moisture comprising: positioning the conductor longitudinally within and spaced from a surrounding tubular housing with the conductor extending beyond the end of the housing, filling the space between said conductor and the interior of said housing with a homogeneous mixture of finely divided glass and a pulverized basic mineral electrically insulating and heat conducting material having a melting point above the softening point of the glass and selected from the class consisting of magnesium oxide, aluminum oxide, and beryllium oxide, with the glass being present in the mixture in the range of from 10 percent to 30 percent by weight of the mixture; and reducing the diameter of said housing to bring the particles of glass and basic material into intimate contact and applying heat to the mixture to raise the temperature of the compressed mixture at least to the softening point of the glass particles but not to the working point thereof to provide that the particles of basic material will be bound together by the glass particles to form a rigid homogeneous mass while the glass particles will not form a continuous vitrified matrix in which the basic material is suspended and the resultant insulation is resistant to high temperature and vibration and the effects of carbonizable fuel and vapors which may be drawn in from the exposed end thereof through which said conductor extends.

2. A method of manufacturing a sheathed electrical conductor suitable for thermocouple assemblies and high voltage, high temperature spark plug connecting leads and resistant to the deterioration of the insulation due to high temperatures, vibration, and the effects of carbonizable fuel and moisture comprising: positioning the conductor longitudinally within and spaced from a surrounding tubular housing with the conductor extending beyond the end of the housing, filling the space between said conductor and the interior of said housing with a homogeneous mixture of finely divided glass and a pulverized basic mineral electrically insulating and heat conducting material having a melting point above the softening point of the glass and selected from the class consisting of magnesium oxide, aluminum oxide, and beryllium oxide, with the glass being present in the mixture in the range of from 10 percent to 30 percent by weight of the mixture, the average particle size of the glass being substantially smaller than the average particle size of the basic material; and tamping the mixture within the housing to compress the mixture and bring the particles of glass and basic material into intimate contact and applying heat to the mixture to raise the temperature of the compressed mixture at least to the softening point of the glass particles but not to the working point thereof to provide that the particles of basic material will be bound together by the glass particles to form a rigid homogeneous mass while the glass particles will not form a continuous vitrified matrix and the resultant insulation is resistant to high temperature and vibration and the effects of carbonizable fuel and vapors which may be drawn in from the exposed end thereof through which said conductor extends.

3. A method of manufacturing a sheathed electrical conductor suitable for thermocouple assemblies and high voltage, high temperature spark plug connecting leads and resistant to the deterioration of the insulation due to high temperatures, vibration, and the effects of carbonizable fuel and moisture comprising: positioning the conductor longitudinally within and spaced from a surrounding tubular housing with the conductor extending beyond the end of the housing, filling the space between said conductor and the interior of said housing with a homogeneous mixture of finely divided glass and a pulverized basic mineral electrically insulating and heat conducting material selected from the class consisting of magnesium oxide, aluminum oxide, and beryllium oxide, with the glass being present in the mixture in the range of from 10 percent to 30 percent by weight of the mixture; applying pressure to the exterior of the housing such as by swaging so as to compress the mixture within the housing to bring the particles of glass and basic material into intimate contact and externally applying heat to the housing to raise the temperature of the compressed mixture within the housing at least to the softening point of the glass particles but not to the working point thereof to provide that the particles of basic material will be bound together by the glass particles to form a rigid homogeneous mass while the glass particles will not form a continuous vitrified matrix and the resultant insulation is resistant to high temperature and vibration and the effects of carbonizable fuel and vapors which may be drawn in from the exposed end thereof through which said conductor extends.

4. A method of manufacturing a sheathed electrical conductor suitable for thermocouple assemblies and high voltage, high temperature spark plug connecting leads and resistant to the deterioration of the insulation due to high temperatures, vibration, and the effects of carbonizable fuel and moisture comprising: positioning the conductor longitudinally within and spaced from a surrounding tubular housing with the conductor extending beyond the end of the housing, filling the space between said conductor and the interior of said housing with a homogeneous mixture of finely divided glass and a pulverized basic mineral electrically insulating and heat conducting material having a melting point above the softening point of the glass and selected from the class consisting of magnesium oxide, aluminum oxide, and beryllium oxide, with the glass being present in the mixture in the range of from 10 percent to 30 percent by weight of the mixture; the glass being a hard lime glass having an approximate composition of 58.6% silicon dioxide, 18.8% aluminum oxide, 9.1% magnesium oxide, 7.3% calcium oxide, 4% boron trioxide, 1.4% sodium oxide, 0.2% potassium oxide, and the balance of residual impurities; and compressing the mixture within the housing to bring the particles of glass and basic material into intimate contact and applying heat to the mixture to raise the temperature of the compressed mixture at least to the softening point of the glass particles but not to the working point thereof to provide that the particles of basic material will be bound together by the glass particles to form a rigid homogeneous mass while the glass particles will not form a continuous vitrified matrix and the resultant insulation is resistant to high temperature and vibration and the effects of carbonizable fuel and vapors which may be drawn in from the exposed end thereof through which said conductor extends.

5. A sheathed electrical conductor assembly suitable for thermocouples and high voltage high temperature spark plug connecting leads resistant to high temperatures and the effects of carbonizable fuel and moisture, comprising a hollow elongated metallic sheath, an electrical conductor disposed within the sheath and extending longitudinally thereof in radially inwardly spaced relation to the sheath, and an electrically insulating and heat conducting mass disposed within the sheath and embedding the conductor to electrically insulate the conductor from the sheath, said conductor extending out beyond one end of the insulating mass, the insulating mass consisting essentially of a homogeneous mixture of finely divided glass particles and a pulverized basic mineral insulating material selected from the class consisting of magnesium oxide, aluminum oxide and beryllium oxide with the glass constituting 10 percent to 30 percent of the weight of the mixture, the glass being substantially discrete within the mixture with respect to the basic material while binding the particles of basic material to form a rigid non-vitrified homogeneous mass which is resistant to high temperatures, vibration, and deterioration due to carbonizable fuels and moisture which may be drawn into the insulation from the exposed end thereof through which said conductor extends, said insulating mass having a melting point above that of said glass and said rigid non-vitrified mass having been formed by heating said mixture to a temperature above the softening point of said glass but below the melting point thereof.

References Cited in the file of this patent

UNITED STATES PATENTS

| | | |
|---|---|---|
| 447,896 | Nash | Mar. 10, 1891 |
| 2,040,051 | Klinger | May 5, 1936 |
| 2,220,775 | Navias | Nov. 5, 1940 |
| 2,293,381 | Carrington | Aug. 18, 1942 |
| 2,408,642 | Hopps et al. | Oct. 1, 1946 |
| 2,475,651 | Turk | July 12, 1949 |
| 2,657,248 | Smits | Oct. 27, 1953 |
| 2,730,439 | Houchins | Jan. 10, 1956 |
| 2,757,220 | Carter | July 31, 1956 |
| 2,887,394 | Bickford | May 19, 1959 |

FOREIGN PATENTS

| | | |
|---|---|---|
| 389,892 | Great Britain | Mar. 30, 1933 |
| 428,094 | Great Britain | May 7, 1935 |
| 555,152 | Great Britain | Aug. 6, 1943 |